United States Patent
Kim et al.

(10) Patent No.: US 10,290,423 B2
(45) Date of Patent: May 14, 2019

(54) CONDUCTIVE POWDER FOR INNER ELECTRODE AND CAPACITOR

(71) Applicant: SAMSUNG ELECTRO-MECHANICS CO., LTD., Suwon-si, Gyeonggi-do (KR)

(72) Inventors: Myeong Gi Kim, Suwon-si (KR); Yu Ra Shin, Suwon-si (KR); Jang Yeol Lee, Suwon-si (KR); Seong Min Chin, Suwon-si (KR); Hak Kwan Kim, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 36 days.

(21) Appl. No.: 15/448,523

(22) Filed: Mar. 2, 2017

(65) Prior Publication Data
US 2018/0144863 A1 May 24, 2018

(30) Foreign Application Priority Data
Nov. 21, 2016 (KR) .................. 10-2016-0155043

(51) Int. Cl.
*H01G 4/008* (2006.01)
*H01G 4/30* (2006.01)
*H01G 4/232* (2006.01)
*H01G 4/248* (2006.01)
*C01B 32/23* (2017.01)
*C01B 32/182* (2017.01)
*H01G 4/12* (2006.01)

(52) U.S. Cl.
CPC .......... *H01G 4/008* (2013.01); *C01B 32/182* (2017.08); *C01B 32/23* (2017.08); *H01G 4/0085* (2013.01); *H01G 4/12* (2013.01); *H01G 4/248* (2013.01); *H01G 4/30* (2013.01); *H01G 4/1227* (2013.01); *H01G 4/232* (2013.01)

(58) Field of Classification Search
None
See application file for complete search history.

(56) References Cited

U.S. PATENT DOCUMENTS

| | | | |
|---|---|---|---|
| 2012/0327558 A1* | 12/2012 | Jeong | H01G 4/008 361/321.4 |
| 2013/0038980 A1 | 2/2013 | Kim et al. | |
| 2013/0038982 A1 | 2/2013 | Lee et al. | |
| 2013/0045385 A1 | 2/2013 | Kim et al. | |
| 2013/0050901 A1 | 2/2013 | Lee et al. | |
| 2013/0134836 A1 | 5/2013 | Hwang et al. | |
| 2016/0079001 A1* | 3/2016 | Lin | H01G 4/008 361/305 |
| 2017/0018761 A1* | 1/2017 | Ogino | H01M 4/134 |

FOREIGN PATENT DOCUMENTS

| | | |
|---|---|---|
| KR | 10-1994-0002878 A | 2/1994 |
| KR | 10-2013-0006783 A | 1/2013 |
| KR | 10-2013-0017984 A | 2/2013 |

(Continued)

Primary Examiner — Jeffrey D Washville
(74) Attorney, Agent, or Firm — Morgan Lewis & Bockius LLP (57) ABSTRACT

A conductive powder for an internal electrode includes a metal particle; and a graphene layer or an oxidized graphene layer disposed on at least a portion of a surface of the metal particle.

8 Claims, 4 Drawing Sheets

(56) References Cited

FOREIGN PATENT DOCUMENTS

| | | |
|---|---|---|
| KR | 10-2013-0017986 A | 2/2013 |
| KR | 10-2013-0019196 A | 2/2013 |
| KR | 10-2013-0021693 A | 3/2013 |
| KR | 10-2013-0058429 A | 6/2013 |
| KR | 10-2016-0102737 A | 8/2016 |

\* cited by examiner

CONDUCTIVE POWDER FOR INNER ELECTRODE AND CAPACITOR

CROSS-REFERENCE TO RELATED APPLICATION

This application claims the benefit of priority to Korean Patent Application No. 10-2016-0155043, filed on Nov. 21, 2016 with the Korean Intellectual Property Office, the entire disclosure of which is incorporated herein by reference.

BACKGROUND

1. Technical Field

The present disclosure relates to a conductive powder for an internal electrode and a capacitor.

2. Description of Related Art

Multilayer ceramic capacitors (MLCCs) are manufactured by including internal electrodes in dielectric ceramic layers and firing the dielectric ceramic layers at a temperature of about 900° C.

Nickel (Ni), palladium (Pd), and copper (Cu) are widely used as materials for internal electrodes, and dielectric ceramic layers are mainly formed of $BaTiO_3$.

With the current demand for compact size, thinning, and high performance of electronic products, there is increased demand for MLCCs having a compact size and high capacitance.

Therefore, in order to make MLCCs compact and ensure high capacitance thereof, research has been conducted into increasing the permittivity of the dielectric ceramic layers and into forming thin, multilayer dielectric ceramic layers and internal electrodes.

As a result, there is increased demand for internal electrodes having a reduced thickness and excellent mechanical strength.

SUMMARY

An aspect of the present disclosure provides a conductive powder for an internal electrode that may have a shrinkage delay effect in a firing operation of a manufacturing process of a capacitor.

Another aspect of the present disclosure provides a capacitor including an internal electrode having a low specific resistance.

According to an aspect of the present disclosure, a conductive powder for an internal electrode includes: a metal particle; and a graphene layer or an oxidized graphene layer disposed on at least a portion of a surface of the metal particle, the graphene layer having a positive charge, and the oxidized graphene layer having a negative charge.

According to another aspect of the present disclosure, a capacitor includes: a body having a plurality of dielectric layers disposed therein; a plurality of internal electrodes disposed between the dielectric layers, and containing metal particles having carbon (C) included in a grain boundary between the metal particles; and a plurality of external electrodes disposed on outer portions of the body, and electrically connected to the internal electrodes.

According to another aspect of the present disclosure, a capacitor includes: a body having a plurality of dielectric layers disposed therein; a plurality of internal electrodes disposed between the dielectric layers, and containing a conductive powder for an internal electrode; and a plurality of external electrodes disposed on outer portions of the body, and electrically connected to the internal electrodes, in which the conductive powder for an internal electrode includes: a metal particle and a graphene layer or an oxidized graphene layer disposed on at least a portion of a surface of the metal particle, the graphene layer having a positive charge, and the oxidized graphene layer having a negative charge.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments of the present disclosure will be described with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated, listed items.

It will be apparent that although the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape resulting from manufacturing. The following embodiments may also be constituted alone or as a combination thereof.

The contents of the present disclosure described below may have a variety of configurations and only a required configuration is proposed herein, but the present disclosure is not limited thereto.

Conductive Powder for Internal Electrode

Figure 1:
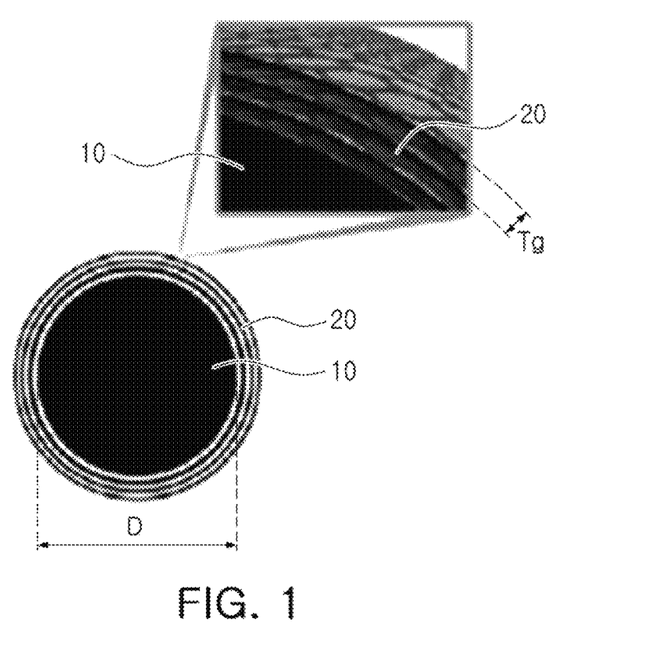
FIG. 1 is a schematic cross-sectional view of a conductive powder for an internal electrode according to an exemplary embodiment.
Figure 2:
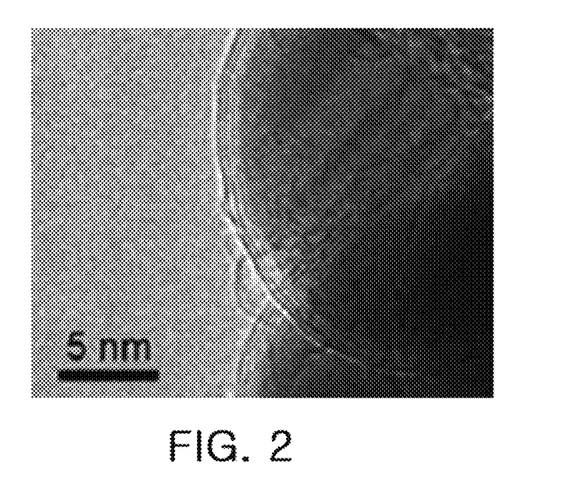
FIG. 2 is an image of a conductive powder for an internal electrode according to an embodiment captured by a transmission electron microscope (TEM)

FIG. 1 is a schematic cross-sectional view of a conductive powder for an internal electrode according to an exemplary embodiment. FIG. 2 is an image of a conductive powder for an internal electrode according to an exemplary embodiment captured by a transmission electron microscope (TEM).

Referring to FIGS. 1 and 2, the conductive powder for an internal electrode according to the present exemplary embodiment will be described.

The conductive powder for an internal electrode, according to the present exemplary embodiment, may include a metal particle 10 and a graphene layer 20 or an oxidized graphene layer 20.

The metal particle 10 may include at least one of nickel (Ni), copper (Cu), cobalt (Co), iron (Fe), platinum (Pt), gold (Au), aluminum (Al), chromium (Cr), magnesium (Mg), manganese (Mn), molybdenum (Mo), rhodium (Rh), silicon (Si), tantalum (Ta), titanium (Ti), tungsten (W), uranium (U), vanadium (V), or zirconium (Zr), but is not limited thereto. For example, the metal particle 10 may include nickel (Ni) having a positive charge or a negative charge on a surface thereof.

The metal particle 10 may have a spherical shape, but is not limited thereto.

The diameter D of the metal particle 10 may be 10 nm to 80 nm.

The metal particle 10 may have the graphene layer 20 or the oxidized graphene layer 20 disposed on at least a portion of the surface thereof.

When the conductive powder for an internal electrode according to the present exemplary embodiment includes the graphene layer 20, the graphene layer 20 may have a positive charge. Also, when the conductive powder for an internal electrode according to the present exemplary embodiment includes the oxidized graphene layer 20, the oxidized graphene layer 20 may have a negative charge.

A method of manufacturing the graphene layer 20 having the positive charge will be briefly described. First, graphite may be provided.

A graphene oxide may be formed by chemically oxidizing the graphite.

Then, a reduced graphene oxide (RGO) having a positive charge may be formed by chemically reforming the graphene oxide.

For example, when the metal particle 10 includes nickel (Ni), a surface of the nickel (Ni) may be treated to have a negative charge, and then the RGO may be formed on the surface of the nickel (Ni) by electrostatic adhesion.

The graphene layer 20, included in the conductive powder for an internal electrode according to the present exemplary embodiment, may have the positive charge, and thus, strong adhesion between the graphene layer 20 and the metal particle 10 may be obtained.

The oxidized graphene layer 20 having the negative charge may also be manufactured in a similar manner as the positively charged graphene layer described above. When the metal particle 10 is treated to have a positive charge, the oxidized graphene layer 20 included in the conductive powder for an internal electrode may have a negative charge, and thus, strong adhesion between the oxidized graphene layer 20 and the metal particle 10 may be obtained.

Since graphene included in the conductive powder for an internal electrode undergoes a chemical treatment process as described above, a ratio (C/O) of carbon (C) atoms to oxygen (O) atoms included in the graphene layer 20 or the oxidized graphene layer 20 may be 5 or greater, and the graphene layer may contain nitrogen (N) in a content of less than 3.5 at %, based on a total content of the graphene layer.

When the ratio (C/O) of carbon (C) atoms to oxygen (O) atoms included in the graphene layer is less than 5, a degree of reduction of the graphene layer may be reduced, to thus degrade electrical characteristics of the conductive powder for an internal electrode and reduce reliability of a capacitor. Also, when the graphene layer contains nitrogen (N) in a content of greater than or equal to 3.5 at %, based on a total content of the graphene layer, the degree of reduction of the graphene layer may be reduced, which degrades the electrical characteristics of the conductive powder for the internal electrodes, as well as the reliability of the capacitor.

Thus, in the conductive powder for an internal electrode according to an embodiment, the ratio (C/O) of carbon (C) atoms to oxygen (O) atoms included in the graphene layer 20 or the oxidized graphene layer 20 may be 5 or greater, and the graphene layer may contain nitrogen (N) in a content of less than 3.5 at %, based on a total content of the graphene layer. As a result, the electrical characteristics of the conductive powder for an internal electrode may be improved while increasing the reliability of the capacitor.

When the graphene layer is formed on the metal particle 10 without using the graphene layer 20 having the positive charge or the oxidized graphene layer 20 having the negative charge, it may be unlikely to uniformly form the graphene layer on the surface of the metal particle 10.

However, the conductive powder for an internal electrode according to the present exemplary embodiment may include the graphene layer 20 having the positive charge or the oxidized graphene layer 20 having the negative charge, and thus, the graphene layer may be uniformly formed on the surface of the metal particle 10. For example, the graphene layer 20 having the positive charge or the oxidized graphene layer 20 having the negative charge may be uniformly formed on the entirety of the surface of the metal particle 10.

Referring to FIGS. 1 and 2, the conductive powder for an internal electrode according to the present exemplary embodiment may have a core-shell structure that includes the metal particle 10 as a core and the graphene layer 20 having the positive charge or the oxidized graphene layer 20 having the negative charge as a shell.

In the present exemplary embodiment, the thickness Tg of the graphene layer 20 having the positive charge or the oxidized graphene layer 20 having the negative charge may be 5 nm, and preferably equal to or less than 1 nm.

When the diameter of the metal particle 10 is defined as D, and the thickness of the graphene layer 20 having the positive charge or the oxidized graphene layer 20 having the negative charge is defined as Tg, Tg/D may be equal to or less than 0.1.

The thickness of a single graphene layer 20 having the positive charge or a single oxidized graphene layer 20 having the negative charge may be 3 Å. About 10 stacked sheets of graphene may be classified as few layer graphene (FLG), and the thickness thereof may be 2 nm to 3 nm. In a case in which the thickness of the metal particle 10 is 60 nm, when Tg/D exceeds 0.1, the number of stacked graphene layers 20 having the positive charge or stacked, oxidized graphene layers 20 having the negative charge may be increased. As the number of stacked graphene layers 20 having the positive charge or stacked oxidized graphene layers 20 having the negative charge is increased, sinterability of the metal particle 10 may be significantly reduced. Further, the number of functional groups decomposed by a high temperature in a firing operation or the like of a manufacturing process of the capacitor may be increased, thereby causing blistering or the like.

Referring to an enlarged view of FIG. 1, the graphene layer 20 having the positive charge or the oxidized graphene layer 20 having the negative charge may have a structure in which a hexagonal lattice formed of carbon (C) atoms is disposed, and may have a similar bonding structure to that of the graphene sheets. Also, the graphene layer 20 having the positive charge or the oxidized graphene layer 20 having the negative charge may maintain a bond angle to have a spherical shape, a cylindrical shape, or a polyhedral shape, but is not limited thereto.

The graphene layer 20 having the positive charge or the oxidized graphene layer 20 having the negative charge may include at least one layer. For example, the graphene layer as illustrated in FIG. 2 may be formed of at least two layers.

Figure 3:
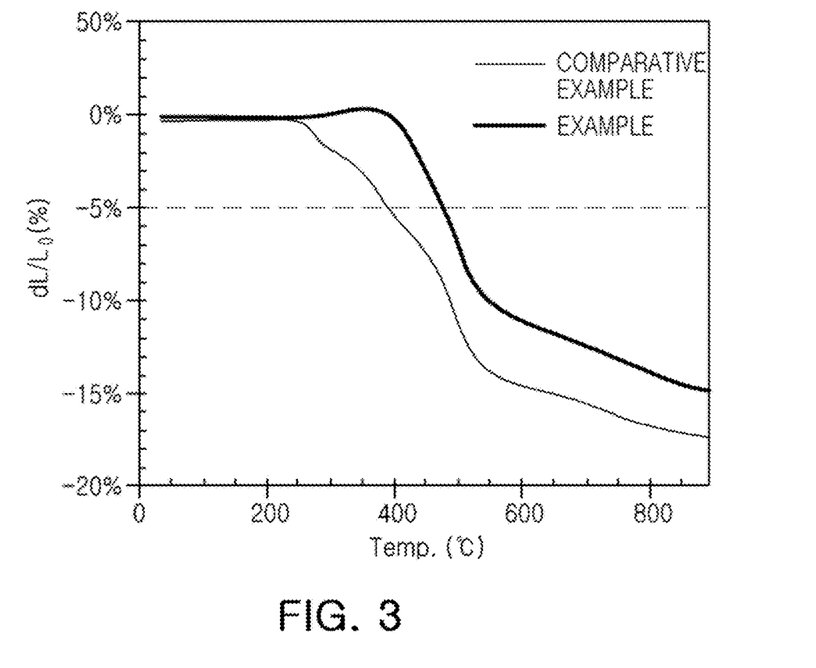
FIG. 3 is a graph illustrating sintering shrinkage behavior measured under heating conditions of a gas flow of 3% $H_2$, 100 cc/min $N_2$, and 10° C./min.

FIG. 3 is a graph illustrating sintering shrinkage behavior measured under heating conditions of a gas flow of 3% $H_2$, 100 cc/min $N_2$, and 10° C./min.

Example of FIG. 3 illustrates a sintering shrinkage behavior measured from an internal electrode manufactured using the conductive powder for an internal electrode according to the present exemplary embodiment, and Comparative Example of FIG. 3 illustrates sintering shrinkage behavior measured from an internal electrode manufactured using a nickel (Ni) powder having an average diameter of 80 nm.

Referring to FIG. 3, in the case of the Comparative Example, a shrinkage starting temperature was 245° C. and a 5% shrinkage temperature was 392° C., but in the case of the Example, a shrinkage starting temperature was 375° C. and a 5% shrinkage temperature was 482° C.

That is, the shrinkage starting temperature of the Example was increased by 130° C., and the 5% shrinkage temperature thereof was raised by 90° C., as compared to the Comparative Example.

In general, a ceramic green sheet for forming a dielectric layer may be fired at a temperature of 1,100° C. or higher, and a conductive paste for forming an internal electrode may be fired and may contract at a temperature lower than the temperature of 1,100° C. or higher. Thus, overfiring of the internal electrode may occur while the firing process is performed to form the dielectric layer, which may cause the internal electrode to become bound or broken and thus cause a reduction in connectivity of the internal electrode. Also, after the firing process, an internal structural defect of the capacitor, such as cracking, may develop.

However, when the internal electrode is formed using the conductive powder for an internal electrode according to the present exemplary embodiment, the shrinkage starting temperature of the Example was increased by 130° C. and the 5% shrinkage temperature thereof was raised by 90° C., as compared to when the internal electrode is formed using only the nickel (Ni) powder, and thus, a difference between shrinkages of the dielectric layer and the internal electrode may be significantly reduced. As a result, a defect or cracks due to the above-mentioned overfiring of the internal electrode may be prevented.

Capacitor

Figure 4:
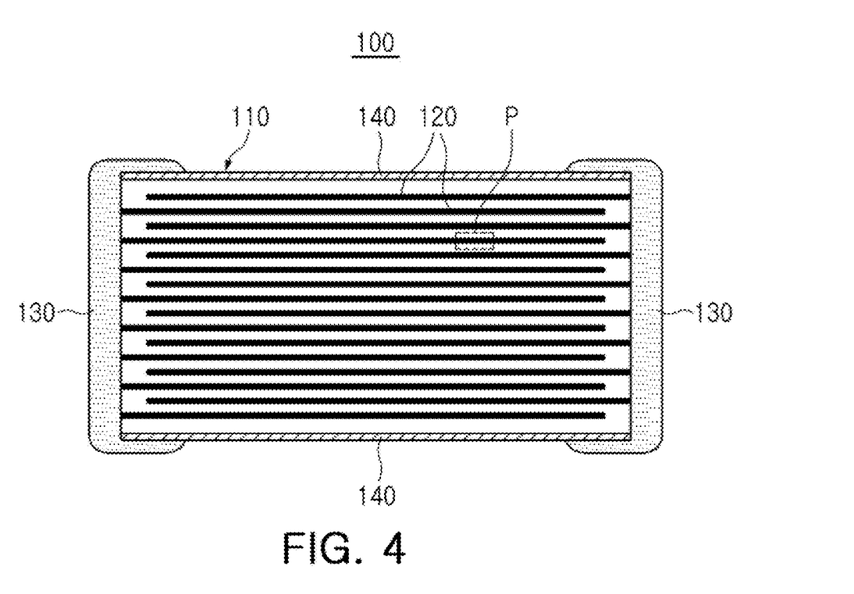
FIG. 4 is a schematic cross-sectional view of a capacitor according to an embodiment.
Figure 5:
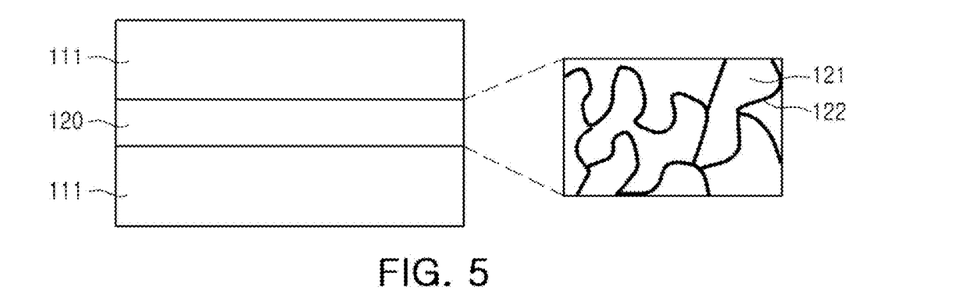
FIG. 5 is an enlarged view of region P of FIG. 4.

FIG. 4 is a schematic cross-sectional view of a capacitor according to an exemplary embodiment. FIG. 5 is an enlarged view of region P of FIG. 4.

Referring to FIGS. 4 and 5, a structure of the capacitor according to the present exemplary embodiment will be described.

A capacitor 100, according to the present exemplary embodiment, may include a body 110, internal electrodes 120, and external electrodes 130.

The body 110 may have a hexahedral shape which may have both end surfaces in a length direction of the body 110, both end surfaces in a width direction of the body 110, and both end surfaces in a thickness direction of the body 110. In other words, the body may include a first surface and a second surface opposing each other, a third surface and a fourth surface connected to the first surface and the second surface and opposing each other, and a fifth surface and a sixth surface connected to the first surface and the second surface and the third surface and the fourth surface and opposing each other. In an embodiment, the first and second surfaces may mean both end surfaces in the length direction of the body 110, the third and fourth surfaces may mean both end surfaces in the thickness direction of the body 110, and the fifth and sixth surfaces may mean both end surfaces in the width direction of the body 110.

The body 110 may be formed by stacking a plurality of dielectric layers 111 in the thickness direction and then firing the dielectric layers 111, and the shape and dimension of the body 110 and the number of the stacked dielectric layers 111 are not limited to those illustrated in this exemplary embodiment.

Also, the dielectric layers 111 forming the body 110 may be integrated to the extent that it may be difficult to identify borders between the dielectric layers 111 without using a scanning electron microscope (SEM).

The dielectric layers 100 may be modified to have a particular thickness, depending on capacitance design of the capacitor 100, may include a ceramic powder having high permittivity, for example, a barium titanate ($BaTiO_3$)-based powder or a strontium titanate ($SrTiO_3$)-based powder, or the like, but the present disclosure is not limited thereto. Also, various types of ceramic additives, organic solvents, plasticizers, binders, dispersants, and the like may be added to the ceramic powder, according to the purpose of the present disclosure.

The average particle diameter of the ceramic powder used for forming the dielectric layers 111 is not particularly limited, may be adjusted to achieve the purpose of the present disclosure, and may be controlled to be, for example, 400 nm or less.

The internal electrodes 120 may include a plurality of pairs of first internal electrodes and second internal electrodes having different polarities. The internal electrodes 120 may be formed to have a certain thickness, with the dielectric layers 111 interposed therebetween. The dielectric layers 111 may be stacked in the thickness direction of the body 110.

The internal electrodes 120 may be formed by printing a conductive paste containing the conductive powder for an internal electrode according to an embodiment so that portions of the internal electrodes 120 are alternately exposed to both end surfaces of the body 110 in the length direction of the body 110 along a stacking direction of the dielectric layers 111, and so that portions of the internal electrodes 120 may be electrically insulated from each other by the dielectric layers 111 interposed therebetween.

For example, the internal electrodes 120 may be electrically connected to the external electrodes 130, formed on both end surfaces in the length direction of the body 110, by the portions of the internal electrodes 120 alternately exposed to both end surfaces of the body 110 in the length direction of the body 110.

Thus, when a voltage is applied to the external electrodes 130, charges may be accumulated between the internal electrodes 120 opposing each other. Here, the capacitance of the capacitor 100 may be proportional to the area of the internal electrodes 120 that overlap each other.

The width of the internal electrodes 120 may be determined by an application of the capacitor 100. For example, the width of the internal electrodes 120 may be determined to be within a range of 0.2 μm to 1.0 μm, considering the size of the body 110, but the present disclosure is not limited thereto.

The external electrodes 130 may be disposed on both end surfaces of the body 110 in the length direction thereof. The external electrodes 130 may be formed by being dipped in a paste containing a metal component, but the present disclosure is not limited thereto.

Also, although not illustrated, plating layers may be formed on the external electrodes 130.

Cover layers 140 having no internal electrode formed therein may be disposed on or below the body 110.

The cover layers 140 may be formed by stacking and pressing a plurality of dielectric layers on which no internal electrode is formed.

Thus, portions of the body 110 may be limited to be the cover layers 140 that do not contribute to the capacitance formation of the capacitor 100. Conversely, a portion of the body 110, in which the internal electrodes 120 may be disposed to contribute to the capacitance formation of the capacitor 100, may be defined as a capacitance portion.

Referring to FIG. 5, carbon (C) may be included in a grain boundary 122 between metal particles 121 included in the internal electrodes 120 of the capacitor 100 according to an exemplary embodiment.

Since the internal electrodes 120 of the capacitor 100, according to the present exemplary embodiment, include the metal particles 121, in which carbon (C) may be disposed in the grain boundary 122, connectivity of the internal electrodes 120 may be remarkably improved.

Therefore, the internal electrodes 120 may be manufactured to have a significantly reduced thickness, as compared with internal electrodes of a capacitor of the related art.

For example, the thickness of the internal electrodes 120 of the capacitor 100 according to an embodiment may be equal to or less than 300 nm, and preferably equal to or less than 100 nm.

Table 1 below illustrates the thickness of the capacitance portion according to the number of the stacked dielectric layers 111 and internal electrodes 120, when the thickness of the dielectric layers 111 is 500 nm and the thicknesses of the internal electrodes 120 are 500 nm, 100 nm, 50 nm, and 10 nm, respectively.

TABLE 1

| | Comparative Example | Example 1 | Example 2 | Example 3 |
|---|---|---|---|---|
| Thickness (nm) of Internal Electrodes | 500 | 100 | 50 | 10 |

| Number of Layers | Thickness of Capacitance Portion (μm) | Thickness of Capacitance Portion (μm) | Thickness of Capacitance Portion (μm) | Thickness of Capacitance Portion (μm) |
|---|---|---|---|---|
| 10 | 10.5 | 6.1 | 5.55 | 5.11 |
| 50 | 50.5 | 30.1 | 27.55 | 25.51 |
| 100 | 100.5 | 60.1 | 55.05 | 51.01 |
| 200 | 200.5 | 120.1 | 110.05 | 102.01 |
| 300 | 300.5 | 180.1 | 165.05 | 153.01 |
| 500 | 500.5 | 300.1 | 275.05 | 255.01 |
| 800 | 800.5 | 480.1 | 440.05 | 408.01 |
| 1000 | 1000.5 | 600.1 | 550.05 | 510.01 |

Referring to Table 1, in the case of the Comparative Example, in order to stack 500 layers in the capacitance portion, the thickness of the capacitance portion needed was 500.5 μm. In addition, in the case of the Comparative Example, in order to stack 1,000 layers in the capacitance portion to manufacture a high capacity capacitor, the thickness of the capacitance portion needed was 1000.5 μm.

However, since the internal electrodes 120 of the capacitor 100 according to an embodiment include the metal particles 121 in which carbon (C) is included in the grain boundary 122, even if the thickness of the internal electrodes 120 is reduced to equal to or less than 100 nm, the connectivity of the internal electrodes 120 may be maintained. Therefore, as illustrated in the internal electrodes 120 of the capacitor 100 according to the present exemplary embodiment, when the thickness of the capacitance portion is greater than or equal to 500.5 μm, the number of dielectric layers 111 stacked in the capacitance portion may be 834 or greater. As a result, the capacity of the capacitor 100 may be remarkably increased, as compared with the case when internal electrodes are formed using a nickel (Ni) powder, as in the related art.

FIGS. 6A and 6B are component analysis images of microstructures of an internal electrode of a capacitor according to another exemplary embodiment, along with graphs showing component analysis.

Figure 6:
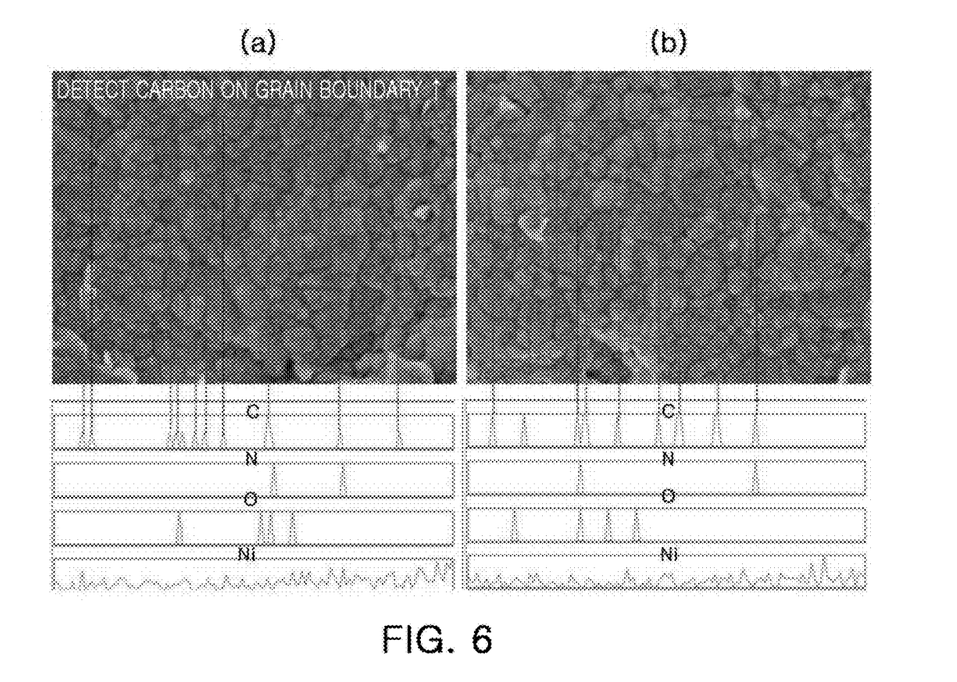
FIG. 6 is component analysis images obtained by capturing microstructures of an internal electrode of a capacitor according to an exemplary embodiment.

Referring to FIG. 6, carbon (C) was detected on the grain boundary 122 between the metal particles 121, indicated by black lines in the images.

Here, the content of carbon (C) contained in the grain boundary 122 between the metal particles 121 included in the internal electrodes 120 of the capacitor 100, according to another embodiment, may be 3 wt % to 5.2 wt %, based on a total weight of the grain boundary.

When the content of carbon (C) contained in the grain boundary 122 between the metal particles 121 is less than 3 wt %, based on a total weight of the grain boundary, the connectivity of the internal electrodes 120 may decrease. When the content of carbon (C) is greater than 5.2 wt %, based on a total weight of the grain boundary, mechanical strength of the internal electrodes 120 may decrease, and thus, reliability of the capacitor 100 may be reduced.

Therefore, when the content of carbon (C) contained in the grain boundary 122 between the metal particles 121 is 3 wt % to 5.2 wt %, based on a total weight of the grain boundary, the connectivity of the internal electrodes 120 may increase, and simultaneously, the mechanical strength of the internal electrodes 120 may increase, and thus, the reliability of the capacitor 100 may be improved.

Figure 7:
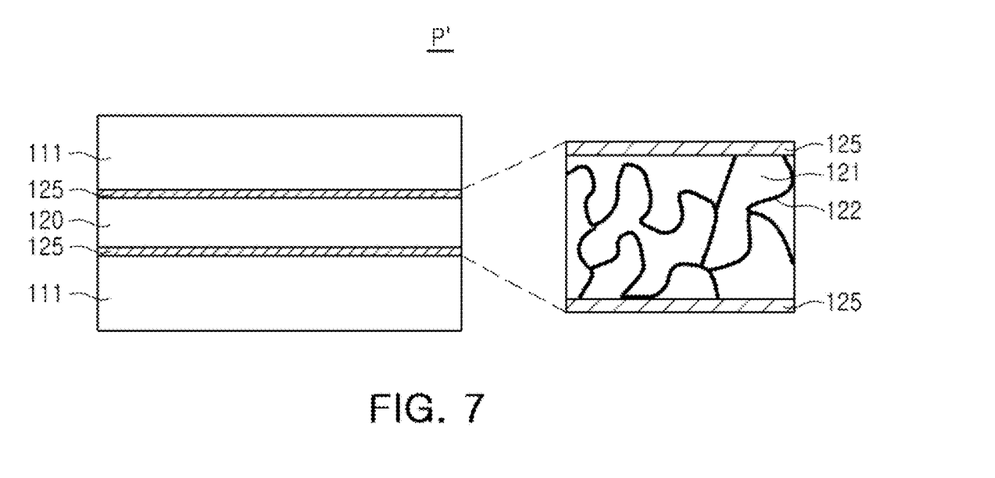
FIG. 7 is an enlarged view of an internal electrode having a graphene electrode layer disposed thereon or therebelow.

FIG. 7 is an enlarged view of an internal electrode having a graphene electrode layer disposed thereon or therebelow.

Referring to FIG. 7, a graphene electrode layer 125 may be disposed on or below the internal electrode 120.

When the capacitor 100 according to an embodiment includes the graphene electrode layer 125, the connectivity of the internal electrode 120 may be 100%.

The graphene electrode layer 125 may have a ratio of carbon (C) atoms to oxygen (O) atoms of 5 or greater, and may contain nitrogen (N) in a content of less than 3.5 at %, based on a total content of the graphene electrode layer.

The graphene electrode layer 125 may be disposed only on or below the internal electrode 120, and may also be disposed both on and below the internal electrode 120, as illustrated in FIG. 6.

The thickness of the graphene electrode layer 125 may be from 9 nm to 11 nm, and may be, for example, 10 nm.

Figure 8:
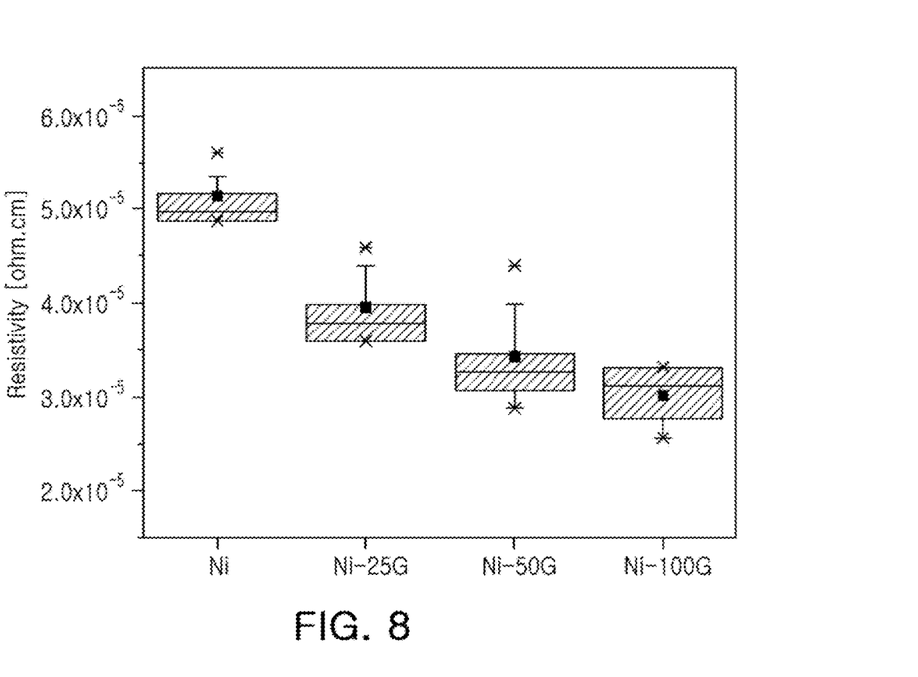
FIG. 8 is a graph illustrating resistivity vs. a content of graphene of an internal electrode.

FIG. 8 is a graph illustrating resistivity vs. a content of graphene of an internal electrode.

FIG. 8 illustrates specific resistances of an internal electrode measured when only a nickel (Ni) powder is included as the conductive powder for an internal electrode, when surfaces of nickel (Ni) metal particles have a graphene layer containing 25 ppm of graphene (Ni-25G), when the surfaces of nickel (Ni) metal particles have a graphene layer containing 50 ppm of graphene (Ni-50G), and when the surfaces of nickel (Ni) metal particles have a graphene layer containing 100 ppm of graphene (Ni-100G).

Referring to FIG. 8, when the graphene layer is not formed on the surfaces of metal particles included in the conductive powder for an internal electrode, a high specific resistance was measured, as compared with when the graphene layer is formed.

As set forth above, according to an exemplary embodiment, since a conductive powder for an internal electrode includes a graphene layer having a positive charge or an oxidized graphene layer having a negative charge, adhesion between the graphene layer or the oxidized graphene layer and a metal powder may be increased, and a shrinkage delay effect in a firing operation of a manufacturing process of a capacitor may be obtained.

Further, a capacitor according to an exemplary embodiment may allow carbon (C) to be included in a grain boundary of each of internal electrodes by a graphene layer or an oxidized graphene layer coated on a metal powder, thereby significantly reducing specific resistance of the internal electrodes.

While exemplary embodiments have been shown and described above, it will be apparent to those skilled in the art that modifications and variations could be made without departing from the scope of the present invention, as defined by the appended claims.

What is claimed is:

1. A capacitor comprising:
   a body having a plurality of dielectric layers disposed therein;
   a plurality of internal electrodes disposed between the dielectric layers, and containing metal particles having graphene included in a grain boundary between the metal particles; and
   a plurality of external electrodes disposed on outer portions of the body, and electrically connected to the internal electrodes.

2. The capacitor of claim 1, wherein the graphene has a content of 3 wt % to 5.2 wt %, based on a total weight of the grain boundary.

3. The capacitor of claim 1, wherein the internal electrodes have a thickness of less than or equal to 300 nm.

4. The capacitor of claim 1, wherein the internal electrodes include a graphene electrode layer disposed thereon or therebelow.

5. The capacitor of claim 4, wherein the graphene electrode layer has a thickness within a range of 9 nm to 11 nm.

6. The capacitor of claim 4, wherein the graphene electrode layer has a ratio of carbon (C) atoms to oxygen (O) atoms of 5 or greater.

7. The capacitor of claim 4, wherein the graphene electrode layer contains nitrogen (N) in a content of 3.5 at % or less, based on a total content of the graphene electrode layer.

8. The conductive powder of claim 1, wherein the body includes a capacitance portion in which the internal electrodes having different polarities are stacked, with the dielectric layers interposed therebetween, and
   wherein the capacitance portion has a thickness greater than or equal to 500.5 μm, and the number of the dielectric layers stacked in the capacitance portion is greater than or equal to 834.

* * * * *